United States Patent [19]

Grape et al.

[11] Patent Number: 4,940,743

[45] Date of Patent: * Jul. 10, 1990

[54] SILICONE RESIN EMULSION

[75] Inventors: Wolfgang Grape, Koeln; Ottfried Schlak; Armand de Montigny, both of Leverkusen; Hermann Kober, Gladbach, all of Fed. Rep. of Germany

[73] Assignee: Bayer Aktiengesellschaft, Leverkusen, Fed. Rep. of Germany

[*] Notice: The portion of the term of this patent subsequent to Apr. 15, 2003 has been disclaimed.

[21] Appl. No.: 715,148

[22] Filed: Mar. 22, 1985

[30] Foreign Application Priority Data

Apr. 6, 1984 [DE] Fed. Rep. of Germany ....... 3412941

[51] Int. Cl.$^5$ ............................................. C09D 183/06
[52] U.S. Cl. ..................................... 524/377; 524/503; 524/728; 524/733; 524/757; 524/837
[58] Field of Search ............... 524/837, 588, 377, 503, 524/728, 733, 757; 106/287.13

[56] References Cited

U.S. PATENT DOCUMENTS

| | | | |
|---|---|---|---|
| 3,076,773 | 2/1963 | Foster | 524/837 |
| 3,624,017 | 11/1971 | Sorkin | 524/837 |
| 4,324,712 | 4/1982 | Vaughn | 524/837 |
| 4,433,027 | 2/1984 | Deiner et al. | |
| 4,524,172 | 6/1985 | Steinberger | 524/588 |
| 4,539,351 | 9/1985 | O'Malley | 524/588 |
| 4,582,874 | 4/1986 | Grape et al. | |

FOREIGN PATENT DOCUMENTS 0130521  1/1985  European Pat. Off. .
2330887  1/1975  Fed. Rep. of Germany .

Primary Examiner—C. Warren Ivy
Attorney, Agent, or Firm—Sprung Horn Kramer & Woods

[57] ABSTRACT

A storage-stable aqueous emulsion of a low molecular weight, alkoxy-functional silicone resin by weight comprising approximately
(a) 1-60% of a silicone resin having a viscosity of from 2 to 2000 mPa.s and of the formula

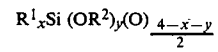

in which
$R^1$ is a monovalent hydrocarbon group having 1 to 14 carbon atoms,
$R^2$ is a monovalent hydrocarbon group having 1 to 18 carbon atoms,
x is from 0.75 to 1.5, and
y is from 0.2 to 2,
(b) 0.1 to 10% of an emulsifying agent, and
(c) 30 to 98.5% by weight of water, the emulsion having an alkaline pH, whereby the storage stability due to reduced hydrolysis is improved.

6 Claims, No Drawings

SILICONE RESIN EMULSION

This invention relates to stable aqueous emulsions of low molecular weight alkoxy-functional silicone resins which are suitable for impregnating and coating purposes and are particularly preferred for those uses where organic solvents are undesirable on account of their toxic properties and the fire risk which they entail. The invention also relates to a process for the preparation of such emulsions.

Silicone resin emulsions are known per se (see e.g. DE-OS 3,200,709). They may be used in many different ways and have proved very suitable for numerous applications on account of their outstanding properties. Their applications lie, for example, in the field of adhesives, separating coatings, lacquer additives and paint formulations.

The known silicone resin emulsions, however, leave room for improvement in some respects. Their depth of penetration is sometimes insufficient for impregnations (e.g. in the building sector) and hardening of the silicone resins and their linkage with other resins is often not entirely satisfactory. It was therefore an object of the present invention to provide silicone resin emulsions which would be even more universal in their application.

The present invention thus relates to storage-stable aqueous emulsions of low molecular weight, alkoxy-functional silicone resins containing (a) 1–60% by weight of silicone resin corresponding to the general formula

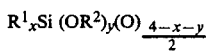

$$R^1_x Si(OR^2)_y(O)_{\frac{4-x-y}{2}}$$

wherein
R$^1$ represents a monovalent hydrocarbon group having 1–14 C-atoms,
R$^2$ represents a monovalent hydrocarbon group having 1 to 18 C-atoms,
x represents a value from 0.75 to 1.5 and
y represents a value from 0.2 to 2.0, and having a viscosity from 2 to 2000 mPa.s, (b) 0.5–10% by weight of an emulsifying agent and
(c) 30–98.5% by weight of water, the pH of the emulsion having an alkaline value.

In contrast to silicone resin emulsions previously described, e.g. in DE-OS 3,200,709, the preparations according to this invention are emulsions of low molecular weight, alkoxy-functional silicone resins. Such alkoxy functional silicone resins are generally highly sensitive to hydrolysis and tend to gel in the presence of water.

It has now surprisingly been found that stable emulsions can be prepared from these low molecular weight alkoxy-functional silicone resins in spite of the large number of reactive groups contained in them. Another surprising feature is that, in spite of the large quantities of water present during the emulsifying process, no substantial quantities of alcohol due to hydrolysis can be detected. Minor quantities of alcohol formed by this route are not harmful and, on the contrary, may even increase the stability of the emulsions according to the invention.

It has surprisingly also been found that the stability of the emulsion prepared according to the invention may be further improved by using the emulsion at an alkaline pH. The use of amines and a pH of 7.5 to 9 is particularly preferred.

The emulsions according to the invention of low molecular weight, alkoxy-functional silicone resins contain the following constituents in addition to water:

1–60% by weight, preferably 20–50% by weight, of an alkoxy-functional, low molecular weight silicone resin having a viscosity of 2 to 2000 mPas, preferably 20 to 200 mPas, and having a composition corresponding to the general formula

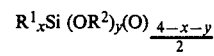

$$R^1_x Si(OR^2)_y(O)_{\frac{4-x-y}{2}}$$

wherein R$^1$ represents a monovalent hydrocarbon group having 1 to 14 carbon atoms, preferably a methyl group, and R$^2$ represents a monovalent hydrocarbon group having 1 to 18 carbon atoms, preferably a methyl group, x represents a value from 0.75 to 1.5, preferably about 1, and y represents a value from 0.2 to 2, preferably 0.4 to 1.2.

The emulsifier component generally consists of 0.5 to 10% of a combination of emulsifying agents, which may be either purely non-ionic emulsifying agents or a combination of a non-ionic emulsifying agent with either an anionic or a cationic emulsifying agent.

From 0 to 3% of another emulsifying agent may also be used, in particular an emulsifying agent which has a thickening effect, preferably one based on cellulose.

Preparation of the emulsion of a low molecular weight, alkoxy-functional silicone resin is followed by adjustment of the pH to an alkaline value. The upper limit of pH is governed by practical considerations. The higher the pH, the more corrosive is the silicone resin emulsion and it is therefore not desirable to add too great an excess of basic compound. At pH values above 12, the low molecular weight, alkoxy-functional silicone resins are less stable in storage. It is therefore preferred to adjust the pH of the emulsion to a value in the range of from 7.5 to 9.

Adjustment of the pH to an alkaline value is preferably carried out by means of an amine. The amines may suitably be primary, secondary or tertiary amines containing carbon, hydrogen and nitrogen and may also contain oxygen, and they should be soluble in the water used for preparing the emulsion. Examples of such amines include diethylamine, ethylene diamine, butylamine, hexylamine, morpholine, monoethanolamine, triethylamine, triethanolamine and diethylethanolamine. Diethylethanolamine is particularly preferred. The amines may be added as such or in the form of aqueous solutions.

The emulsions according to the invention are distinguished by their high stability in storage. The expression "storage-stable" means that the emulsion is capable of being stored at least three months under normal storage conditions without separating or undergoing gelling.

In the field of silicone resins, it is customary to prepare such resins in solvents. The low molecular weight, alkoxy-functional resins may therefore still contain organic solvents from their process of preparation but the quantity of solvent should not exceed 20%, based on the quantity of silicone resin. Toluene, xylene and hydrocarbons, e.g. petroleum hydrocarbon fractions, are possible solvents for such resins. These organic solvents in no way impair the properties (e.g. stability) of the emulsion and yet are in many cases undesirable. The preferred method of emulsification according to the invention is that which leaves no organic solvent in the emulsion, i.e. the organic solvent is first removed.

It is advantageous to add to the emulsion according to the invention an emulsion of a substance which will promote subsequent adherence to a substrate or subsequent hardening, e.g. up to about 3% by weight of an alkyl tin salt. According to the preferred embodiment, the emulsion according to the invention may be mixed with an alkyl tin salt immediately after it has been prepared, although such a hardening emulsion could be added immediately before use.

Suitable hardening catalysts include e.g. the known alkyl tin salts such as dibutyl tin dilaurate, dialkyl tin stearate, dialkyl tin octoate, etc.

The process of preparation of the alkoxy-functional silicone resins to be used according to the invention is known and is carried out by the reaction of alkyl and/or aryl chlorosilanes with alcohol and water (see e.g. GB-PS 685 173, DE-OS 958 702, FR-PS 1,475,709, US-PS 3,668,180, DE-AS 2,061,189, DE-OS 2,444,529, DE-AS 2,532,887, EPI-PC 3610 and DE-OS 3,000,782).

Methyl methoxy silicone resin, which is particularly preferred according to the invention, is prepared by the reaction of methyl-trichlorosilanes with methanol and water although mixtures of methyl-trichlorosilane and other alkyl and/or aryl chlorosilanes and/or tetrachlorosilane may be used for the preparation of the alkoxy-functional silicone resins without thereby impairing the stability of the emulsion according to the invention. Equally, mixtures of different alcohols may be used for the preparation of the resin and/or various alkoxy-functional silicone resins may be mixed together without thereby impairing the stability of the emulsion according to the invention. However, owing to the overall combination of properties and the relatively low cost methyl trichlorosilane and methanol are preferred for the prepation of the alkoxy-functional silicone resin. Minor quantities of substances which promote subsequent adherence to a substrate or subsequent hardening of the silicone resin on the substrate may be added to the silicone resin but such substances are preferably added as separately prepared emulsions or dispersions or are dissolved in the water of the emulsion according to the invention.

Water-based emulsions of the silicone resins described above are prepared by using a combination of emulsifying agents. A combination of two non-ionic emulsifiers is preferably used for this purpose. These emulsifying agents may be polyoxyethylene derivatives of fatty alcohols, e.g. POE(4)-lauryl alcohol, POE(10)-cetyl alcohol, POE(20)-stearyl alcohol, POE(2)-oleyl alcohol or POE(20)-oleyl alcohol, etc., polyoxyethylene derivatives of fatty acids, e.g. POE-laurate, POE-stearate, POE-oleate, etc., polyoxyethylene sorbitan fatty acid esters, e.g. POE(20)-sorbitan monolaurate, PEO(20)-sorbitan monopalmitate, POE(4)-sorbitan monostearate, POE(20)-sorbitan tristearate, POE(5)-sorbitan monooleate, etc., polyoxyethylene derivatives of polyhydric alcohols, e.g. POE-triglyceride, polyoxyethylene derivatives of nonylphenol, e.g. POE(10)-nonylphenol, POE(20)-nonylphenol, etc., sorbitan fatty acid esters, e.g., sorbitan monolaurate, sorbitan monostearate, sorbitan tristearate, etc., and the like.

The quantity of emulsifying agents required to emulsify 100 parts by weight of resin solids will vary within a wide range depending on the conditions of the process and the choice of the other constituents of the emulsion. When the emulsions cf low molecular weight, alkoxy-functional silicone resins are prepared according to the invention, the quantity of emulsifying agents required will depend primarily on the alkoxy group content of the alkoxy-functional silicone resin, although a quantity of emulsifier amounting to 10 parts by weight, based on 100 parts by weight of silicone resin, is generally sufficient for the preparation of a storage-stable emulsion of a low molecular weight, alkoxy-functional silicone resin. It is particularly preferred to use a combination of non-ionic emulsifying agents, in particular a combination of the non-ionic emulsifying agents, POE(40)-triglyceride/POE(2)-oleyl alcohol or a combination of the non-ionic emulsifying agents POE(40)-triglyceride/POE(6)-tridecylalcohol for preparing stable emulsions of low molecular weight, alkoxy-funtional silicone resins although other combinations of non-ionic emulsifying agents are also suitable. Such non-ionic emulsifying agents are well known to the man of the art (see e.g. Stache, Tensidtaschenbuch, Hanser Verlag; McCutcheon's Detergents and Emulsifiers, North American Edition, 1979).

One of the two non-ionic emulsifying agents may be replaced either by a cationic or by an anionic emulsifying agent, in other words, a combination of non-ionic emulsifying agent with a cationic or an anionic emulsifying agent may be used.

Any of the emulsifying auxiliaries known to the man of the art may be used. Emulsifying auxiliaries which have a thixotropic action are particularly preferred, in particular the sodium salt of carboxymethyl cellulose,, but other emulsifying auxiliaries may also be used, e.g. relatively long-chained alcohols, polyvinyl alcohols, urea, etc.

The methods for the preparation of emulsions are also well known to the man of the art.(see e.g. E. Manegold, Emulsionen; P. Becker, Emulsions, Theory and Practice, New York 1965, Chapter 7. The sequence in which the various constituents are added is generally not decisive. Owing to the susceptibility of low molecular weight, alkoxy-functional silicone resins to hydrolysis, it is preferred to emulsify such resins by a method consisting of introducing into the reaction vessel an aqueous solution containing the emulsifying agents and auxiliaries and then introducing the alkoxy-funtional resin into this solution. The use of mechanical emulsifying aids such as high speed stirrers (Ultraturrax) or pressure emulsifying machines with colloid mills may also be desirable.

Adjustment of the pH to an alkaline value is preferably carried out immediately after preparation of the emulsion of low molecular weight, alkoxy-functional silicone resin. The amine used for adjusting the pH is added either as such or in the form of an aqueous solution.

The silicone resin emulsions according to the invention are used mainly for impregnating and coating cellulose material or inorganic-oxidic materials (e.g. brickwork), optionally in combination with other emulsions or dispersions. They are suitable for rendering mineral insulating materials hydrophobic and are used as water-repellent binders in dispersion paints. The subject of the present invention will now be described in detail in the following examples (percentages given are percentages by weight unless otherwise indicated).

Examples

Example 1: Preparation of a methyl methoxy resin

10 Moles of methanol are mixed with 5 moles of water and slowly added from a dropping funnel, at an initial temperature of 30° C., to a mixture of 6 moles of methyl trichlorosilane and 400 g of xylene which is kept vigorously stirred in a three-necked flask. Gaseous HCl escapes through the condenser attachment. The reaction mixture rapidly cools. After addition of the aqueous methanol solution, the reaction mixture is heated to 40° C. and a mixture of methanol and HCl is distilled off under vacuum. Any remaining HCl is neutralized with anhydrous sodium carbonate and the solvent is then distilled off at 30 mbar to a sump temperature of 135° C. A clear, colorless liquid having a viscosity of 50 mPas at 23° C. is obtained after cooling and filtration. The composition of the methyl-methoxy-silicone resin prepared as described above corresponds to the overall formula $CH_3Si(O)_{1.1}(OCH_3)_{0.8}$.

Example 2: Emulsification of a methyl methoxy silicone resin prepared as described under 1.

56 kg of water are introduced into a stirrer vessel and heated to 60° C. with stirring. 3.2 kg of the melted first emulsifier (polyoxyethylene triglyceride) are added. After cooling of the mixture to 40° C., 0.8 kg of the second emulsifier (oleyl alcohol with two ethylene oxide units) is. After further stirring for 10 minutes, 40 kg of the resin prepared as described in Example 1 are added within 1½ hours. Stirring is then continued for a further 30 minutes.

The emulsion is homogenized 9 times, using a high pressure emulsifying machine. The pH is then adjusted to 8.0 by the addition of diethylethanolamine, using a pH meter. About 30 g of amine are required for this purpose. The emulsion prepared as described above is stable for longer than 6 months in spite of the high alkoxy content of the alkoxy-functional, low molecular weight silicone resin.

Example 3:

A silicone resin emulsion having a silicone resin content of 40% as in Example 2 was diluted with water in a ratio of 1:10 (A). For comparison, 1.5% by weight of a 15% emulsion of dioctyl tin maleate (B) was added to the 40% silicone resin emulsion before dilution.

Dry samples of building material measuring 50×50×15 mm were treated with these emulsions by immersion. The immersion time was 10 seconds. The samples prepared in this manner were dried at room temperature for 7 days and then at 50° C. for 3 days.

The capillary water absorption in percent by weight was determined by storing the sample bodies in cold water in which they were immersed to a depth of about 3 mm.

The following results were obtained:

| Building material | Water absorption 2 hours | 6 hours | % by weight 24 hours |
|---|---|---|---|
| Brick untreated | 8.5 | 9.0 | 9.8 |
| Brick impregnated (A) | 2.2 | 2.8 | 3.3 |
| Brick impregnated (B) | 0.2 | 0.2 | 0.2 |

It will be understood that the specification and examples are illustrative but not limitative of the present invention and that other embodiments within the spirit and scope of the invention will suggest themselves to those skilled in the art.

We claim:

1. A storage-stable aqueous emulsion of a low molecular weight, alkoxy-functional silicone resin by weight comprising essentially of
   (a) 1–60% of a silicone resin having a viscosity of from 2 to 2000 mPa.s and of the formula $$R^1_x Si(OR^2)_y(O)_{\frac{4-x-y}{2}}$$

in which
   $R^1$ is a monovalent hydrocarbon group having 1 to 14 carbon atoms,
   $R^2$ is a monovalent hydrocarbon group having 1 to 18 carbon atoms,
   x is from 0.75 to 1.5, and
   y is from 0.2 to 2,
   (b) 0.1 to 10% of an emulsifying agent component, wherein the emulsifying agent component is a combination of two non-ionic emulsifiers,
   (c) 30 to 98.5% by weight of water, and
   (d) 0 to 3% of an emulsifying auxiliary which has a thickening effect, said emulsifying auxiliary being selected from the group consisting of the sodium salt of carboxymethyl cellulose, polyvinyl alcohols and urea,
   the emulsion having an alkaline pH.

2. An emulsion according to claim 1, wherein the emulsifying component is a combination of two non-ionic emulsifiers and the pH is established by diethylethanolamine.

3. An emulsion according to claim 2, further containing an alkyl tin salt.

4. An emulsion according to claim 3, wherein said alkyl tin salt is selected from the group consisting of dibutyl tin dilaurate, dialkyl tin stearate and dialkyl tin octoate.

5. An emulsion according to claim 1, wherein the combination of two non-ionic emulsifying agents is POE(40)-triglyceride/POE(2)-oleyl alcohol.

6. An emulsion according to claim 1, wherein the combination of two non-ionic emulsifying agents is POE(40)-triglyceride/POE(6)-tridecylalcohol.

* * * * *

UNITED STATES PATENT AND TRADEMARK OFFICE
CERTIFICATE OF CORRECTION

PATENT NO. : 4,940,743

DATED : July 10, 1990

INVENTOR(S) : Grape et al.

It is certified that error appears in the above-identified patent and that said Letters Patent is hereby corrected as shown below:

Title Page          [75] Inventors: After " Hermann Kober, " insert -- Bergisch --

Col. 6, claim 1 line 19      Delete " comprising " and substitute -- consisting --

Signed and Sealed this

Second Day of June, 1992

Attest:

DOUGLAS B. COMER

Attesting Officer          Acting Commissioner of Patents and Trademarks